United States Patent

[11] 3,601,364

| [72] | Inventor | Domer Scaramucci |
| | | 3245 S. Hattie, Oklahoma City, Okla. 73129 |
| [21] | Appl. No. | 847,564 |
| [22] | Filed | Aug. 5, 1969 |
| [45] | Patented | Aug. 24, 1971 |

[54] DISC VALVE ASSEMBLY WITH INSERTABLE VALVE MEMBER AND SEATS
5 Claims, 5 Drawing Figs.

[52] U.S. Cl. .................................................. 251/306
[51] Int. Cl. .................................................. F16k 1/22
[50] Field of Search .......................................... 137/454.2; 251/148, 305–308, 315

[56] References Cited
UNITED STATES PATENTS
3,497,178  2/1970  Priese ............................ 251/315 X

*Primary Examiner*—Henry T. Klinksiek
*Attorney*—Dunlap, Laney, Hessin & Dougherty

ABSTRACT: A disc valve assembly wherein the seats and the disc valve member, having the valve stems connected thereto, are axially insertable in the valve body.

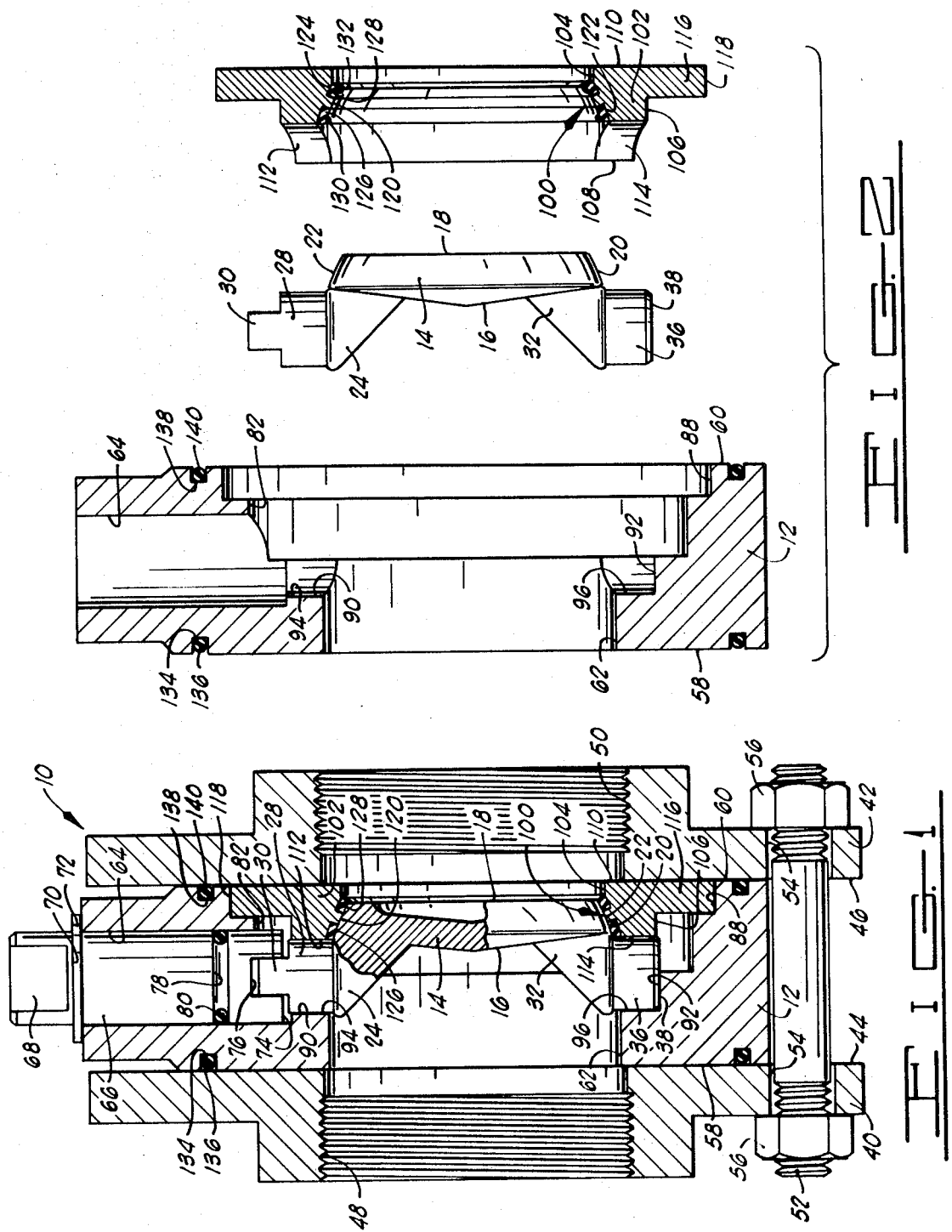

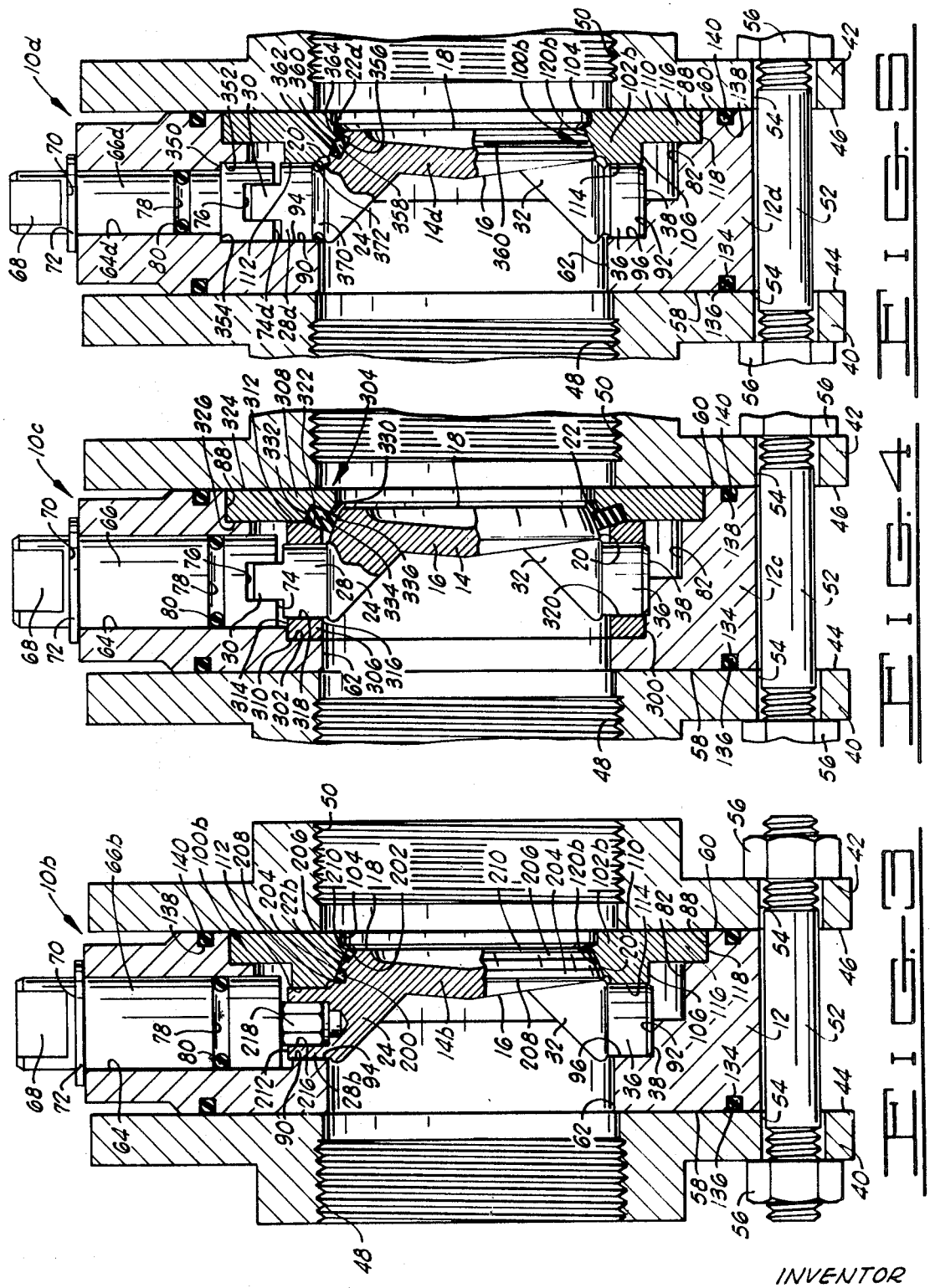

3,601,364

DISC VALVE ASSEMBLY WITH INSERTABLE VALVE MEMBER AND SEATS

BACKGROUND OF THE INVENTION

1. Field of the Invention

This invention relates generally to improvements in valves, and more particularly, but not by way of limitation, to an improved disc valve assembly having an insertable disc valve member and seat.

2. Description of the Prior Art

In what may be considered the usual disc valve construction, the disc is secured to upper and lower valve stems by screws or bolts, and the stems are journaled in the valve body. In this type of construction, the procedure for connecting the valve stems to the disc generally requires working from both ends of the valve body simultaneously. The disc has to be held in position from one end of the valve body while connecting the valve stems to the disc from the opposite end of the valve body. The result in many instances was a loose connection between the valve stems and the disc valve member, thereby resulting in a misalignment between the disc valve member and the seats.

It should also be noted that the procedure, described generally above, not only required additional assembly time during the manufacture of the valve, but also required additional time during the disassembly of the valve, or additional downtime required during the field repair of the valve. There are applications where it is desirable to connect the valve stems to the disc valve member prior to inserting them in the valve body, thereby assuring a tight fit therebetween, and a quicker, simpler assembly and disassembly procedure.

SUMMARY OF THE INVENTION

The present invention contemplates a valve assembly which basically includes a disc valve member having opposite end faces and a seating surface formed about the outer periphery thereof generally between the opposite end faces. A first valve stem is connected to an upper portion of the disc valve member, and a second valve stem is connected to a lower portion of the disc valve member. A valve body is adapted to axially receive the disc valve member, including the first and second valve stems connected thereto. The disc valve assembly also includes a seat which is adapted to be inserted or removed axially in the valve body. The seat has a portion thereof which is sized and disposed to seatingly and sealingly engage the seating surface on the disc valve member. A third valve stem is journaled in the valve body, and the lower end portion thereof is removably interconnected to the upper end portion of the first valve stem for turning the disc valve member from a fully open to a fully closed position.

An object of the invention is to facilitate the repair of valve assemblies in the field.

Another object of the invention is to provide a disc valve assembly wherein the cost to manufacture and assemble the various components of the valve assembly is reduced to a minimum, as well as provide a valve assembly which will have a long service life.

A further object of the invention is to provide a disc valve assembly wherein a secure connection between the valve stems and the disc valve member is assured, and yet the disc valve member is insertable in the valve body.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly, assembled between two flanges.

FIG. 2 is an exploded view of the major portion of the valve assembly of FIG. 1.

FIG. 3 is a view similar to FIG. 1, but illustrating a modified valve assembly.

FIG. 4 is another view similar to FIG. 1, but illustrating yet another modified valve assembly.

FIG. 5 is a view similar to FIG. 1, but illustrating still another modified valve assembly.

DESCRIPTION OF THE PREFERRED EMBODIMENT

Referring to the drawings in detail, and to FIGS. 1 and 2 in particular, shown therein and designated by the general reference character 10, is a valve assembly basically comprising a valve body 12 and a disc valve member 14 rotatably disposed therein.

The disc valve member 14 is generally circular in shape, and is preferably constructed of a relatively rigid material. The disc valve member 14 has opposite end faces 16 and 18, and an outer periphery 20. A seating surface 22, conforming to a portion of a sphere, is formed on the outer periphery 20.

An upper flange 24 is formed on the end face 16 of the disc valve member 14, and extends a distance axially therefrom. A first valve stem 28 is formed on the upper edge of the upper flange 24, and extends in a generally upward direction radially therefrom, terminating with an upper end portion 30. The upper end portion 30 of the first valve stem 28 is basically rectangularly shaped, and is sized to interconnectingly fit into a third valve stem, in a manner to be more fully described below.

A lower flange 32 formed on the end face 16 of the disc valve member 14, and extends a distance axially therefrom. The lower flange 32 is disposed generally near the outer periphery 20 of the disc valve member 14 at a lower portion thereof, generally opposite the upper flange 24. A second valve stem 36 is formed on the lower end of the lower flange 32, and extends in a generally downward direction radially therefrom, terminating with a lower end 38. As shown in FIGS. 1 and 2, the first and second valve stems 28 and 36, respectively, are radially aligned, and each is sized to journally support the disc valve member 14 in the valve body 12.

As shown more clearly in FIG. 1, the first and second valve stems 28 and 36 are sized and disposed on the disc valve member 14 such that the seating surface 22 of the disc valve member 14 is axially offset from the turning axis of the valve assembly 10 when the disc valve member 14 is rotated to a closed position. This particular construction has been found to be desirable, particularly in high-pressure applications due to the improved seating characteristics thereof.

The valve assembly 10, as shown in an assembled position in FIG. 1, is disposed between a pair of flanges 40 and 42, respectively. Each of the flanges 40 and 42 includes an end face 44 or 46, and a threaded opening 48 or 50, respectively. The threaded openings 48 and 50 are axially aligned and sized to receive the threaded ends of adjacent sections of a conduit (not shown).

The valve body 12 and the flanges 40 and 42 are held in an assembled relationship by a plurality of threaded bolts 52 that extend through apertures 54 in the flanges 40 and 42, and about the outer periphery of the valve body 12. Each of the bolts 52 is provided with a pair of threaded nuts 56 that engage the flanges 40 and 42.

The valve body 12, in the preferred form, is basically tubular-shaped, having opposite end faces 58 and 60 and a bore 62 extending therethrough intersecting the end faces 58 and 60. An aperture 64 extends transversely through the valve body 12, intersecting the bore 62 therein.

A third valve stem 66 is journaled in the valve body 12, and extends through the transversely extending aperture 64. Thus, the centerline of the third valve stem 66 extends generally at a right angle to the centerline of the bore 62 in the valve body 12. The upper portion 68 of the third valve stem 66 is adapted to receive and cooperate with a valve handle or other appropriate operator (not shown), for turning the third valve stem 66 and thereby rotating the disc valve member 14 about a turning axis from a fully open to a fully closed position, as will be described more fully below. Various forms of valve handles and valve operators are well known in the art and no further description is required herein. A groove 70 is formed in the upper portion 68 of the third valve stem 66, and a retaining ring 72 is disposed in the groove 70 to limit the downward movement of the third valve stem 66 in the aperture 64.

In an assembled position as shown in FIG. 1, the third valve stem 66 extends downwardly in the aperture 64 terminating with a lower end 74 thereof. A rectangularly shaped recess 76 is formed in the lower end portion 74 of the third valve stem 66. The recess 76 is sized to matingly and interconnectingly receive the rectangularly shaped end 30 of the first valve stem 28, thereby providing the interconnection therebetween.

A second annular groove 78 is formed in the third valve stem 66 generally between the upper portion 68 and the lowermost end portion 74 thereof. An O-ring seal member 80 is disposed in the groove 78. The O-ring seal member 80 is sized to sealingly engage the walls of the aperture 64 and third valve stem 66, thereby providing a fluidtight seal therebetween.

A counterbore 82 is formed in a medial portion of the bore 62, primarily to accommodate the upper portion 30 of the first valve stem 28 as the disc valve member 14 is inserted axially into the valve body 12, as will be more fully described below. Another counterbore 88 is formed in the end of the bore 62 adjacent the end 60 of the valve body 12. The counterbore 88 has a larger diameter than the counterbore 82. The counterbore 88 is provided to receive and cooperate with a seat assembly, as will be described below.

A pair of recesses 90 and 92 are formed in the valve body 12, and each recess 90 and 92 intersects the wall formed by the counterbore 82 in the valve body 12. Each of the recesses 90 and 92 forms a wall 94 or 96, respectively, in the valve body 12, and each wall 94 and 96 has a generally semicircular-shaped cross section. The recesses 90 and 92 and the associated walls 94 and 96, respectively, are sized to journally receive a portion of the first and second valve stems 28 and 36, respectively, and to cooperate with a seat assembly to journally support the disc valve member 14 in the valve body 12, in a manner to be made more apparent below.

A seat assembly 100 is disposed in the bore 62 of the valve body 12, and is adapted to sealingly engage the disc valve member 14, in one position thereof, and to cooperate with the valve body 12 to journally support the disc valve member 14 rotatably therein. The seat assembly 100, as shown more clearly in FIG. 2, basically comprises a seat ring 102, having an inner periphery 104, an outer periphery 106, a valve member end 108 and a nonvalve member end 110.

A pair of recesses 112 and 114 are formed in the valve member end 108 of the seat ring 102. The recesses 112 and 114 basically have a semicircular-shaped cross section, and as shown in FIGS. 1 and 2, are radially aligned and oppositely disposed on the seat ring 102. The recesses 112 and 114 are sized to journally extend about a portion of the first and second valve stems 28 and 36, respectively, thereby cooperating with the recesses 90 and 92 in the valve body 12 to journally secure and support the disc valve member in the valve body 12. In one form, the recesses 112 and 114 are sized to cooperate with the recesses 90 and 92 of the valve body 12 to encompass the first or second valve stems 28 or 36, journally therein.

A flange 116 is formed on the outer periphery 106 of the seat ring 102, generally adjacent the nonvalve member end 110 thereof. The flange 116 extends radially from the seat ring 102 terminating with an outer periphery 118. The outer periphery 118 of the flange 116 is sized to slidingly fit in counterbore 88 of valve body 12. The flange 116 is sized such that, in an assembled position as shown in FIG. 1, the flange 116 abuts the wall formed between the counterbore 82 and 88 in the valve body 12 to limit the axial inward movement of the seat ring 102, thereby positioning the seat ring 102 in the valve body 12. In the assembled position, the nonvalve member end 110 of the seat ring 102 is coplanar with the end face 60 of the valve body 12.

A seating surface 102 is formed on a portion of the inner periphery 104 of the seat ring 102. The seating surface 120 is sized and disposed to seatingly engage the seating surface 22 of the disc valve member 14, when the disc valve member has been rotated to a closed position.

As shown more clearly in FIG. 2, a pair of annular grooves 122 and 124 are formed in the seating surface 120 of the seat ring 102. A pair of seal members 126 and 128 are bonded in the grooves 122 and 124, respectively. For purposes of clarity of description, the seal members 126 and 128 will be referred to below as the inner seal member 126 and the outer seal member 128.

An annular bead 130 is formed on the inner periphery of the inner seal member 126 and an annular bead 132 is formed on the inner periphery of the outer seal member 128. The annular beads 130 and 132 are shown in an exaggerated proportion in FIG. 2 for purposes of clarity and each projects radially inwardly from the respective inner or outer seal member 126 or 128, generally beyond the seating surface 120 of the seat ring 102. The annular beads 130 and 132 are sized to sealingly engage the disc valve member 14, when the disc valve member 14 is rotated to the closed position.

In a preferred form, the inner and outer seal members 126 and 128 are molded integrally with the annular beads 130 and 132, and are constructed of an elastomeric material. The seat ring 102 is preferably constructed from a metal or a reinforced plastic material.

An annular groove 134 is formed in the end face 58 of the valve body 12, and an O-ring seal 136 is disposed in the groove 134. The O-ring 136 is sized to sealingly engage the valve body 12 and the end face 44 of the flange 40, thereby forming a fluidtight seal therebetween.

An annular groove 138 is formed in the end face 60 of the valve body 12, and an O-ring seal 140 is disposed in the groove 138. The O-ring 140 is sized to sealingly engage the valve body 12 and the end face 46 of the flange 42, thereby forming a fluidtight seal therebetween.

Operation of FIGS. 1 and 2

The valve body 12 of the valve assembly 10 is sized and shaped such that the disc valve member 14, including the first and second valve stems 28 and 36, respectively, and the seat assembly 100 can be inserted axially into the valve body 12. The disc valve member 14, as shown in FIGS. 1 and 2, is inserted axially into the bore of the valve body 12, into a position wherein a portion of the first valve stem 28 generally engages the recess 90 in the valve body 12 and a portion of the second valve stem 36 journally engages the recess 92 in the valve body 12. As the disc valve member 14 is inserted axially into the valve body 12, the upper portion 30 of the first valve stem 28 will travel in the area provided the upper portion of the counterbore 82 in the valve body 12.

In the assembled position as shown in FIG. 1, the first valve stem 28 is radially aligned with the aperture 64 of the valve body 12. In this position the third valve stem 66 is inserted downwardly through the aperture 64 to a position wherein the recess 76 of the first valve stem 66 interconnectingly receives the rectangular end portion 30 in the first valve stem 28. Due to this interconnection between the third valve stem 66 and first valve stem 28, when the valve handle (not shown) is turned, thereby rotating the third valve stem 66, the turning or rotating motion is transmitted to the disc valve member 14. The disc valve member 14 may thus be rotated from an open position, that is a position wherein the disc valve member 14 is in line with the bore 62 and the valve body 12, to a closed position, that is, a position wherein the disc valve member 14 is transverse to the axis of the bore 62 in the valve body 12.

The seat assembly 100 is inserted axially in the bore 62 of the valve body 12 to a position wherein the flange 116 engages the wall formed between the counterbores 82 and 88. In the assembled position of the seat assembly 100 as shown in FIG. 1, the recesses 112 and 114 journally receive a portion of the first and second valve stems 28 and 36, respectively, and the seat assembly 100 thereby cooperates with the valve body 12 to journally support the disc valve member 14 therein.

As shown more clearly in FIG. 1, the lower portion of the counterbore 82 in the valve body 12 provides a gap between the valve body 12 and a portion of the seat ring 102, thereby reducing the contact area between the valve body 12 and the seat assembly 100. This reduction of the contacting area is particularly important in those applications involving the handling of corrosive fluids where a certain amount of corrosion may be expected to take place between various contacting portions of the valve assembly 10. Thus, the seat assembly 100 can be slipped in and out of the valve body 12 with a minimum interference.

The valve assembly 10 is held in an assembled relationship by the bolts 52 which extend through the flanges 16 and 18 and about the valve body 12. In the assembled position, the end face 44 of the flange 40 engages the end face 58 of the valve body 12. A portion of the end face 46 of the flange 42 engages the end face 60 of the valve body 12, and another portion of the end face 46 of the flange 42 engages the nonvalve member end 110 of the seat assembly 100. It is apparent from the foregoing that the flanges 40 and 42 not only secure the valve assembly 10 in an assembled position, but also the flanges 40 and 42, and more particularly the flange 42, cooperate with the valve body 12 to secure the seat assembly 100 in the assembled position.

When the disc valve member 14 is rotated to the closed position, as shown in FIG. 1, the seat assembly 100 sealingly engages the disc valve member 14 about the seating surface 22 thereon, and fluid will not flow through the valve assembly 10. When the disc valve member 14 is in the closed position, and as described above, the annular beads 130 and 132 of the inner and outer seal members 126 and 128, respectively, are deformed generally between the seating surface 22 of the disc valve member 14 and the seating surface 120 of the seat ring 102.

For the purposes of the following description of the operation of the seat assembly 100, it will be assumed that the end face 18 of the disc valve member 14 generally faces the upstream end of the valve assembly 10; the end face 16 of the disc valve member 14 generally faces the downstream of the valve assembly 10 and the disc valve member 14 is in the closed position. With the disc valve member 14 in the closed position as described above, the deformed annular bead 132 of the outer seal member 128 is exposed to pressure existing in the threaded opening 50 of the flange 42 and forms a pressure-responsive-type of seal between the seat assembly 100 and the disc valve member 14. In other words, the pressure in the upstream end of the valve assembly 10 will act on the annular bead 32 to augment the sealing effectiveness between the seat assembly 100 and the disc valve member 14. The deformed annular bead 130 of the inner seal member 126 is compressed by the seating surface 20 of the disc valve 14, and thereby provides a secondary compression seal between the seat assembly 100 and the disc valve member 14.

It is apparent from the foregoing description, that if fluid pressure existed in the opposite end of the valve body 12 from that described above, the seat assembly 100 would still provide a fluidtight seal about the disc valve member 14 in much the same manner as that described before. The salient difference being that the inner seal member 126 would function in the nature of a pressure responsive seal and the outer seal member 128 would function in the nature of a compression-type-seal.

It is apparent from the foregoing description that the valve assembly 10 provides a valve where the disc valve member 14 with the integrally formed stems and the seat assembly can be inserted axially into the bore of the valve body 12, thereby substantially reducing the time required to assemble and disassemble the valve assembly 10. This reduction of assembly and disassembly time reduces the manufacturing cost and permits the valve assembly 10 to be repaired in the field in a quicker, simpler manner. Since the disc valve member and the seat assembly described herein are both inserted axially through the same end of the valve body, it is apparent that the valve assembly, as described before, can be completely disassembled in the field by simply removing one of the flanges connected thereto.

It is also apparent from the foregoing that the valve assembly 10 is constructed such that the valve body, with the disc valve member and seat assembly mounted therein, may be completely removed from a particular installation by simply loosening the bolts about the valve body, and lifting the valve body from between the two flanges. This feature would be particularly important in applications where the valve assembly is installed between conduits which, because of associated components connected thereto, are not easily separated.

Embodiment of FIG. 3

The modified valve assembly 10b shown in FIG. 3, is constructed in the same manner as the valve assembly 10, except as noted below.

The disc valve member 14b is constructed similar to the disc valve member 14, one difference being that a pair of grooves 200 and 202 are formed in the seating surface 22b of the disc valve member 14b. The groove 200 extends from the end face 16 of the disc valve member 14b, and the groove 202 extends from the end face 18 of the disc valve member 14b.

An inner seal member 204 is bonded in the groove 200, and an outer seal member 206 is bonded in the groove 202. An annular bead 208 is formed in the inner periphery of the seal 204 and an annular bead 210 is formed on the inner periphery of the outer seal member 206. Each annular bead 208 and 210 extends radially from the respective inner or outer seal member 204 or 206 beyond the seating surface 22b of the disc valve member 14b. Each annular bead 208 and 210 is sized to sealingly engage the seating surface 120b of the seat assembly 100b, when the disc valve member 14b is rotated to the closed position.

The first valve stem 28b is constructed similar to the first valve stem 28, shown in FIGS. 1 and 2, except that the first valve stem 28b does not have a rectangularly shaped upper portion similar to the rectangularly shaped portion 30 of the first valve stem 28. The first valve stem 28b terminates with a upper end 202, and a recess 216 formed therein. The recess 216 has a generally hexagonally shaped cross section, for reasons which will be made apparent below.

The third valve stem 66b is constructed similar to the third valve stem 66, shown in FIGS. 1 and 2, except that the lower end portion 218 of the third valve stem 66b has a generally hexagonally shaped cross section, and is adapted and sized to matingly fit into the recess 216 of the first valve stem 28b, thereby providing the interconnection therebetween. The turning movement of the valve handle or valve operator (not shown) is thus transmitted to the disc valve member 14b, via the interconnection between the third valve stem 66b and the first valve stem 28b, and the disc valve member 14b may thus be rotated from a fully open to a fully closed position.

The seat ring 102b of the seat assembly 100b is constructed identical to the seat ring 102, shown in FIGS. 1 and 2, except there are no grooves in the seating surface 120 formed thereon, similar to the grooves 122 and 124 formed in the seat ring 102. Since the sealing elements are carried by the disc valve member, as described above, the seat assembly 100b need only provide a seating surface to cooperate with the disc valve member 14b to form a fluidtight seal therebetween.

Operation of FIG. 3

The valve assembly 10b operate substantially the same as the valve assembly 10, described before. The salient differences with respect to operation being the manner in which the sealing engagement is formed between the disc valve member 14b and the seat assembly 100b, as will be described below.

When the disc valve member 14b is rotated to the closed position, the annular beads 208 and 210 on the inner and outer seal members 204 and 206, respectively, will be deformed between the seating surface 22b of the disc valve member 14b and the seating surface 122b of the seat assembly 100b. Assuming that upstream fluid pressure is exerted on the end face 18 of the disc valve assembly 14b, the deformed portion of the annular bead 210 of the outer seal member 206 will be exposed to the upstream pressure in the valve assembly 10. The outer seal member 206 therefore provides a pressure-responsive seal, that is, the pressure existing in the upstream portion of the valve assembly 10b will augment the sealing effectiveness of the outer seal member 206 between the seat assembly 100b and the disc valve member 14b. The deformed portion of the annular bead 208 of the inner seal member 204 is compressed between the disc valve member 14b and the seat assembly 100b, and forms a secondary compression-type seal between the seat assembly 100b and the disc valve member 14b. Assuming that upstream pressure is exerted on the end face 16 of the disc valve member 14b, the inner and outer seal members 204 and 206, respectively, will function to provide a fluidtight seal between the disc valve member 14b and the seal assembly 100b in a manner similar to that described above, except the inner seal member 204 would function as the primary pressure responsive seal member and the outer seal member 206 would provide a secondary compression-type seal.

It is apparent from the foregoing, that a sealing engagement is established between the disc valve member 14b and the seat assembly 100b in a manner similar to that described with respect to the disc valve member 14 and the seat assembly 100, shown in FIGS. 1 and 2. The salient difference being that in the valve assembly 10b, shown in FIG. 3, the elastomeric seal members are carried by the disc valve member 14b rather than the seat assembly. It is also apparent from the foregoing that the valve assembly 10b retains all the advantages previously described with respect to the valve assembly 10, and in addition provides an alternate form of sealing between the disc valve member and the seat assembly, as well as an alternate form for providing the interconnection between the third valve stem and the first valve stem, either of which may be more desirable in a particular application.

Embodiment of FIG. 4

Shown in FIG. 4 is a modified valve assembly 10c, which is constructed in the same manner as the valve assembly 10, except as described below.

The valve body 12c has a counterbore 300 formed in the bore 62 in lieu of the recesses 90 and 92 as described above, thereby providing an annular wall 302. The counterbores 82, 88 and 300 are provided to receive and cooperate with a seat assembly 304.

The seat assembly 304 basically includes a bearing ring 306 and a seat ring 308. The bearing ring 306 includes a nonvalve member end 310, a valve member end 312, an outer periphery 314 and inner periphery 316. An upper aperture 318 is formed in the bearing ring 306, and the aperture 318 is sized to journally receive a portion of the first valve stem 28. A lower aperture 320 is formed in a lower portion of the bearing ring 306, and the aperture 320 is sized to journally receive a portion of the second valve stem 36. The bearing ring 306 therefore cooperates with the first and second valve stem 28 and 36 to journally support the disc valve member 14 in the valve body 12c. The bearing ring 306 is split into two separate components either along the horizontal centerline thereof, or along the vertical centerline thereof, so that the bearing ring 306 may be assembled about the first and second valve stems 28 and 36, respectively, as shown in FIG. 4.

The outer periphery 314 of the bearing ring 306 is sized to slidingly fit into the counterbore 300 in the valve body 12c. In an assembled position, the nonvalve member end 310 of the bearing ring 306 abuts the annular wall 302 formed between the counterbore 300 and bore 62 to limit the inward axial movement of the bearing ring 306 in the valve body 12c. A chamfered portion 322 is formed on the valve member end 312 of the bearing ring 306, intersecting the inner periphery 316 thereof, for purposes to be described.

The seat ring 308 has a nonvalve member end 324 and a valve member end 326, and is sized to slidingly fit into the counterbore 88 of the valve body 12c. In an assembled position, the valve member end 326 of the seat ring 308 abuts the wall formed between the counterbores 82 and 88 to limit the inward axial movement of the seat ring 308, and to position the seat ring 308 in the valve body 12c. As shown in FIG. 4, a portion of the valve member end 326 of the seat ring 308 abuts the valve member end 312 of the bearing ring 306, and thereby cooperates with the flanges 40 and 42 and the valve body 12c to secure the bearing ring 306 in an assembled position.

A chamfered portion 330 is formed on the inner periphery of the seat ring 308 intersecting the valve member end 326 thereof. A groove 332 is formed in the chamfered portion 330 and also intersects the valve member end 326 of the seat ring 308. An elastomeric seal member 334 is disposed in the groove 332, and in a preferred form is bonded thereto. A portion 336 of the seal member 334 is sized to extend beyond the chamfered portion 330 in order that the portion 336 will sealingly engage the seating surface 22 of the disc valve member 14, when the disc valve member 14 is in the closed position.

As shown in FIG. 4, a portion of the seal member 334 is sized to extend beyond the valve member end 326 of the seat ring 308 to sealingly engage the chamfered portion 322 of the bearing ring 306. It is apparent from the foregoing that the seal member 334 not only provides the sealing engagement between the seat ring 308 and the disc valve member 14, but also provides a sealing engagement between the seat ring 308 and the bearing ring 306.

Operation of FIG. 4

Valve assembly 10c will operate substantially the same as the valve assembly 10, shown in FIGS. 1 and 2. The salient differences being the manner in which the disc valve member 14 is journally supported in the valve body 12c, and the operation of the seat assembly 304 to provide a fluidtight seal between the seat assembly 304 and the disc valve member 14.

In the valve assembly 10c, the disc valve member 14 is journally supported in the valve body 12c by the bearing ring 306, which is axially insertable and removable. Thus in the valve assembly 10c those portions thereof which journally engage the first and second valve stems 28 and 36, respectively, are replaceable, namely the bearing ring 306. Since the portions of the valve assembly 10c which journally support the valve stems constitute one of the major components of the valve assembly which are subject to wear, the valve assembly 10c reduces the cost of field repairs and replacements, in that the bearing ring 306, rather than the entire valve body, may be replaced.

When the disc valve member 14 is rotated to the closed position, the seating surface 22 of the disc valve member 14 will seatingly and sealingly engage the elastomeric seal member 334. The elastomeric seal member 334 thereby provides a fluidtight seal between the seat assembly 304 and the disc valve member 14.

It is apparent from the foregoing that the valve assembly 10c retains all of the advantages of the valve assembly 10, described before, and in addition provides a valve assembly wherein the portions thereof which journally engage the first and second valve stems of the disc valve member are replaceable.

Embodiment of FIG. 5

The modified valve assembly 10d, shown in FIG. 5, is constructed substantially the same as the valve assembly 10, shown in FIGS. 1 and 2. The salient differences being that the valve assembly 10d includes a modified third valve stem 66d and a modified disc valve member 14d. It should be noted that the valve assembly 10d includes the seat assembly, 100b, described before.

The third valve stem 66d is constructed exactly like the first valve stem 66, except the lower end portion of the third valve stem 66d generally adjacent the lower end 74d thereof has a larger diameter than the remaining upper portion of the third valve stem 66d. The lower end portion 74d thereby forms an upwardly facing surface 350 encircling the third valve stem 66d.

A counterbore 352 is formed in the aperture 64d generally adjacent the bore 62 in the valve body 12d, thereby providing a downwardly facing surface 354 therein. The counterbore 350 is sized to receive and cooperate with the lower end portion 74d of the third valve stem 66d, thereby limiting the upward movement of the third valve stem 66d in the aperture 64d.

In an assembled position as shown in FIG. 5, the upwardly facing surface 350 about the third valve stem 66d will engage the downwardly facing surface 354 in the valve body 12d. The engagement of the lower end portion 74d of the third valve stem 66d and the valve body 12d will provide a secondary or backup metal-to-metal seal in the event a fire destroys the O-ring 80 about the third valve stem 66d. This particular type of secondary metal-to-metal seal construction is not possible in most disc valve assemblies.

The disc valve member 14d has an annular groove 356 formed about the seating surface 22d, generally between the end faces 16 and 18 of the disc valve member 14d. An elastomeric seal member 358 is disposed in the groove 356, and in a preferred form is bonded therein.

Annular bead 360 is formed on the seal member 358, and extends a distance radially therefrom. Thus, as shown in FIG. 5, the annular bead 360 extends beyond the seating surface 22d of the disc valve member 14d. The annular bead 360 is sized to sealingly engage the seating surface 120b of the seat assembly 100b when the disc valve member 14d is rotated to the closed position. Recesses 362 and 364 are formed in the seal member 358 on opposite sides of the annular bead 360.

The first valve stem 28d is constructed exactly like the first valve stem 28, shown in FIGS. 1 and 2, except the first valve stem 28d also includes an annular groove 370 about the outer periphery thereof. An O-ring seal member 372 is disposed in the annular groove 370, and in an assembled position, the O-ring seal member 372 is sized and disposed such that a portion thereof sealingly engages a portion of the seating surface 120b of the seat assembly 100b generally adjacent the recess 112 therein, and the remaining portion of the O-ring seal member 372 is sized and disposed to sealingly engage the valve body 12 generally about the recess 90 therein.

Operation of FIG. 5

The valve assembly 10d will operate substantially the same as valve assembly 10. The salient differences between the valve assembly 10d and the valve assembly 10 being the particular construction of the third valve stem 66d to provide a secondary metal-to-metal seal, and the operation of the modified disc valve member 14d.

When the disc valve member 14d is rotated to the closed position, the annular bead 360 of the seal member 358 will be compressed into sealing engagement between disc valve member 14d and seating surface 120b of the seat assembly 100b. The recesses 362 and 364, which are disposed on opposite sides of the annular bead 360, cooperate with the annular bead 360 to enable the seal member 358 to provide a pressure-responsive-type seal regardless of whether the end face 16 or the end face 18 of the disc valve member 14d is exposed to the upstream pressure in the valve assembly 10d. Thus the seal member 358 provides what may be referred to as a two-way-type of seal.

The O-ring 372 of the first valve stem 28d operates to provide a fluid-type seal between the first valve stem 28d, the seat assembly 100b and the valve body 12d.

It is apparent from the foregoing that the assemblies described herein are adapted such that the seat assembly and the disc valve member, including the valve stems connected thereto, can be inserted axially into the bore of the valve body. It is thus apparent that the valve assembly described herein provide valves which may be quickly and easily assembled and disassembled, thereby reducing manufacturing costs and reducing downtime encountered during field repair of the valve assemblies.

Changes may be made in the construction of parts or elements of the various embodiments as disclosed herein without departing from the spirit and scope of the invention.

What is claimed is:

1. A valve assembly, comprising:
   a vertically disposed disc valve member having opposite end faces and a seating surface formed about the outer periphery thereof generally between the opposite end faces;
   a first valve stem, having an upper end and a lower end, the lower end thereof connected to an upper end portion of the disc valve member;
   a second valve stem, having an upper end and a lower end, the upper end thereof connected to a lower portion of the disc valve member; a seat assembly, including:
   a seat ring constructed of a relatively inflexible material engaging said first and second valve stems and having a seating surface formed on a portion thereof, the seating surface seatingly engaging a portion of the seating surface of the disc valve member in one position of the disc valve member, a flange formed on a portion of the seat ring extending radially therefrom; and
   seal means disposed in a portion of the seating surface of the seat ring, the seal means sealingly engaging a portion of the seating surface of the disc valve member in one position of the disc valve member;
   a valve body having opposite end faces and a bore extending therethrough, a counterbore formed in a portion of the valve body intersecting one end face thereof, another counterbore formed in a portion of the valve body intersecting the same end face as the first-mentioned counterbore, the first-mentioned counterbore having a larger diameter than the last-mentioned counterbore, a portion of the valve body formed by the last-mentioned counterbore engaging a portion of the flange formed on the seat ring and positioning the seat ring in the valve body in one direction, an upper recess formed in a portion of the valve body, journally engaging a portion of the first valve stem and positioning the first valve stem in the valve body in one direction, a lower recess formed in a portion of the valve body journally engaging a portion of the second valve stem and positioning the second valve stem in the valve body in one direction, the first-mentioned counterbore, the last-mentioned counterbore, the upper recess and the lower recess insertably receiving the disc valve member having the first valve stem and the second valve stem connected thereto via the end face of the valve body intersected by the first-mentioned counterbore and the last-mentioned counterbore; and
   a third valve stem having an upper end and a lower end, journaled in the valve body and having a recess formed through the lower end thereof, the recess in the third valve stem interconnectingly receiving a portion of the upper end of the first valve stem as the disc valve member having the first valve stem and the second valve stem is inserted into the valve body for turning the disc valve member from a fully open to a fully closed position.

2. A valve assembly of claim 1 wherein the first valve stem is connected to the disc valve member such that the turning axis of the disc valve member is axially offset from the seating surface on the disc valve member.

3. The valve assembly of claim 1 wherein the lower end of the third valve stem has a larger diameter than the remainder of the third valve stem to engage the valve body and limit the movement of the third valve stem in one direction.

4. The valve assembly of claim 1 wherein the seat ring is defined further to include an upper recess and a lower recess formed therein, a portion of the seat ring formed by the upper recess journally engaging a portion of the first valve stem and a portion of the seat ring formed by the lower recess journally engaging a portion of the second valve stem, the upper and the lower recesses in the seat ring cooperating with the upper and the lower recesses in the valve body to journally support the disc valve member in an assembled position.

5. The valve assembly of claim 1 wherein the seal means is defined further to include:
an inner elastomeric seal member disposed in the seating surface and having a portion thereof extending beyond the seating surface and exposed to the pressure at one end of the valve assembly; and
an outer elastomeric seal member disposed in the seating surface, having a portion thereof extending beyond the seating surface and exposed to the pressure existing in the opposite end of the valve assembly with respect to the end of the valve assembly exposed to in the inner seal member.